United States Patent
Mezenner

(10) Patent No.: US 7,820,063 B2
(45) Date of Patent: Oct. 26, 2010

(54) MICROMIRROR DEVICE AND A METHOD OF MAKING THE SAME

(75) Inventor: Rabah Mezenner, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 482 days.

(21) Appl. No.: 11/941,416

(22) Filed: Nov. 16, 2007

(65) Prior Publication Data

US 2009/0130303 A1    May 21, 2009

(51) Int. Cl.
*C23F 1/00*    (2006.01)

(52) U.S. Cl. .................. 216/2; 216/24; 438/52

(58) Field of Classification Search .................. 216/2, 216/24; 438/48, 52; 359/291
See application file for complete search history.

(56) References Cited

U.S. PATENT DOCUMENTS 5,646,768 A * 7/1997 Kaeriyama ............... 359/224.1
2007/0273954 A1   11/2007 Mangrum

* cited by examiner

*Primary Examiner*—Roberts Culbert
(74) *Attorney, Agent, or Firm*—Wade James Brady, III; Frederick J. Telecky, Jr.

(57) ABSTRACT

A reflective and deformable micromirror device comprises a reflective micromirror plate attached to a deformable hinge that is formed on and held by a hinge post on a substrate. The substrate has an addressing electrode formed thereon. A selected dielectric material is disposed between the deformable hinge and the addressing electrode.

25 Claims, 10 Drawing Sheets

MICROMIRROR DEVICE AND A METHOD OF MAKING THE SAME

TECHNICAL FIELD OF THE DISCLOSURE

The technical field of this disclosure relates to the art of microelectromechanical devices, and more particularly to the art of micromirror devices and methods of making the same.

BACKGROUND OF THE DISCLOSURE

Microelectromechanical systems (MEMS) are devices with characteristic dimensions of hundreds of microns or less, which integrate electrical and mechanical elements through microfabrication technologies. Micromirror devices are a type of microelectromechanical systems. A typical micromirror device, such as a device for use in spatial light modulation or a device in optical signal switching has an electrode, a deflectable and reflective mirror plate, a deformable hinge, and other desired functional members on a substrate.

Deflection of the mirror plate is enabled by attaching the mirror plate to the deformable hinge; and elevating the deformable hinge above the substrate using one or more hinge posts such that at least a portion of the hinge is free to be deformed. Deflection of the mirror plate can be controlled by the electrode disposed proximate to the mirror plate such that an electrostatic field can be established between the electrode and the mirror plate. Such electrostatic field yields an electrostatic torque to the mirror plate; and thus moves the mirror plate with the electrostatic torque.

As a way of example, FIG. 1A illustrates a micromirror device in the art. The micromirror has mirror plate portion 102 that further includes reflective mirror plate 110 and a mirror post (not shown) provided for attaching the mirror plate to the deformable hinge (112). Hinge structure portion 104 comprises deformable hinge 112, hinge arm 114, and posts (e.g. post 118) that are provided for attaching the hinge structure portion to the underneath electrode portion 106. The hinge structure portion (104) in this example has other features, such as elevated electrode 116 and landing tip 120. The elevated electrode (116) is for moving the mirror plate; and the landing tip is a flexible beam structure for limiting rotation of the mirror plate at desired rotational angles.

The electrode portion (106) has addressing electrodes, such as electrode 122 and a base to which the above hinge structure portion can be attached.

The mirror plate portion (102), hinge structure portion (104), and electrode portion 106 are assembled to substrate 124 having formed thereon electrical circuitry for controlling the micromirror.

To enable establishment of the electrostatic field, the mirror plate is desired to be electrical connected to the external sources, such as power sources and signal sources. An approach of such electrical connection is accomplished by electrically connecting the mirror plate to the hinge; and electrically connecting the hinge to the electrical contact pads that are often formed on the substrate. Electrical connection of the hinge to the contact pads are often accomplished by providing an electrically conductive layer inside the hinge post(s) and connecting such conductive layer to the deformable hinge and the contact pads. FIG. 1B illustrates an exemplary electrical connection of the deformable hinge in the micromirror device as illustrated in FIG. 1A.

Referring to FIG. 1B, electrode layer 136 is a metallic layer for electrode 122 in FIG. 1A; and electrically conductive layer 134 (e.g. a TiN layer) is formed on metallic layer 136. Electrical insulating layer 133, such as a $SiO_2$ layer is formed on the conductive layer 134 to protect underneath conductive layer and prevent electrical short. Hinge layer 137, which is a member of the deformable hinge (112 in FIG. 1A), is connected to the conductive layer 134 through post 135 such that the deformable hinge is electrically connected to the underneath electrode structure.

For improving the mechanical property of the post, as well as the deformable hinge, internal sidewall of the post (135) is often covered by a mechanical enhancing material (113), which is a dielectric material, such as oxide material (e.g. $SiO_2$).

Micromirrors with such electrical connection mechanisms, however, have disadvantages. For example, because the quality and performance of the electrical connection increases with increase of the dimension of the hinge post and the thickness of the electrical conductive layer of the deformable hinge, it is desired for a thick conductive layer in the deformable hinge and large hinge post. However, thicker deformable hinge and larger hinge post increase the size of the micromirror, which in turn limit size-reduction of the micromirrors. Moreover, the deformable hinge with increased dimension limits the possibility of operating the micromirrors with low voltages.

The oxide coatings on the internal sidewall of the hinge post also have disadvantages. For example, a process of forming such sidewall coatings during fabrication may generate defects in the micromirrors, which may reduce yield.

SUMMARY

In view of the foregoing, disclosed herein is a micromirror device that comprises a deformable hinge formed on a substrate and held above the substrate by a hinge post. The hinge post can be formed in, and thus substantially surrounded by a dielectric material.

In one example, a method of making a micromirror device is disclosed herein. The method comprises: depositing a spacer layer comprising a dielectric material on a substrate formed thereon an electric pad; patterning and etching the spacer layer so as to form a hinge via region and a clearance region in which at least a portion of the dielectric material is removed; filling the via region with a hinge post material; depositing a first sacrificial layer comprising a sacrificial material on the etched spacer layer; forming a deformable hinge on the sacrificial material; depositing a second sacrificial layer comprising a sacrificial material on the formed deformable hinge; forming a reflective mirror on the second sacrificial layer; and removing the first and second sacrificial layers so as to form the micromirror device with the spacer material therein.

In another example, a method of making a micromirror device is disclosed herein. The method comprises: providing a substrate having an electrode pad formed thereon; depositing a spacer layer comprising a dielectric material; patterning and etching the spacer layer so as to form a hinge post via region; filling the via region with a hinge post material; pattern the spacer layer to form a trench; etching the patterned spacer; depositing a first sacrificial material on the spacer layer; depositing and patterning a hinge layer on the first sacrificial layer; etching the patterned hinge layer and the spacer layer so as to form a deformable hinge at a location in the vicinity of and above the trench; depositing and patterning a second sacrificial layer; forming a reflective mirror plate on the second sacrificial layer; and removing the first and second sacrificial layers so as to form the micromirror device with the dielectric material.

In yet another example, a method of making a micromirror device is disclosed herein. The method comprises: providing a substrate having an electrode pad formed thereon; depositing a spacer layer comprising a dielectric material; patterning and etching the spacer layer so as to form a trench; depositing a first sacrificial material on the patterned spacer layer; forming a hinge via region on the spacer layer; forming a deformable hinge on the spacer layer such that the deformable hinge is in connection with the hinge via region and supported thereby above the substrate; depositing a second sacrificial layer; forming a reflective mirror plate on the second sacrificial layer; and removing the first and second sacrificial layers so as to form the micromirror device with at least a portion of the spacer layer.

In still yet another example, a method of making a micromirror device is disclosed herein. The method comprises: providing a substrate having an electrode pad formed thereon; depositing a spacer layer comprising a dielectric material; patterning and etching the spacer layer so as to form a trench and a hinge via region; depositing and patterning a hinge layer on the spacer layer; etching the patterned hinge layer and the spacer layer so as to form a deformable hinge at a location in the vicinity of and above the trench; depositing and patterning a second sacrificial layer; forming a reflective mirror plate on the second sacrificial layer; and removing the first and second sacrificial layers so as to form the micromirror device with the dielectric material.

In yet another example, a method of forming a microelectromechanical device that comprises a deformable hinge suspended above a substrate by a hinge post is disclosed herein. The method comprises: forming a spacer layer on the substrate, said spacer layer comprises first and second portions that define a via region; filling the via region so as to form the hinge post; patterning and etching the spacer layer so as to form a concave region at a location corresponding to the deformable hinge; forming a deformable hinge on the spacer layer at a location corresponding to the concave region in the spacer layer such that the deformable hinge is in connection with the hinge post.

In yet another example, a method of forming a microelectromechanical device that comprises a deformable hinge suspended above a substrate by a hinge post is disclosed herein. The method comprises: forming a spacer layer on the substrate, said spacer layer comprises first and second portions that define a via region; filling the via region so as to form the hinge post; patterning the spacer layer so as to form a concave region at a location corresponding to the deformable hinge; depositing a hinge layer comprising a hinge material; and patterning hinge layer; and etching the patterned hinge layer and the spacer layer so as to form a deformable hinge on the spacer layer at a location corresponding to the concave region in the spacer layer such that the deformable hinge is in connection with the hinge post.

In yet another example, a micromirror device is disclosed herein. The device comprises: a semiconductor substrate having an addressing layer that comprises an electrode; a hinge layer comprising a deformable hinge that is held by a hinge post above the substrate; a reflective mirror plate attached to the deformable hinge such that the mirror plate is capable of moving above the substrate; and a dielectric layer of a dielectric material within a space between the deformable hinge and the addressing electrode, wherein the dielectric material substantially covers an exterior side wall of the hinge post.

DETAILED DESCRIPTION OF SELECTED EXAMPLES

In view of the foregoing, disclosed herein is a micromirror device that comprises a reflective mirror plate, a deformable hinge, and a dielectric material for modulating aerodynamic damping, minimizing interference effects, and at the same time increasing the scalability of the micromirror device. In one example, a dielectric material is provided in a micromirror device. Specifically, a dielectric material can be disposed around and/or covering portions or the entire hinge post to which the deformable hinge is attached. Such configuration can improve the mechanical integrity of the deformable hinge, as well as the micromirror device. By selecting a proper material for the post, the electrical integrity and/or the mechanical integrity of the micromirror device can also be improved; while at the same time, allows for scaling of the micromirror device. Other benefits can be obvious with the following discussions, drawing figures, and claims attached hereto.

Figure 1A:
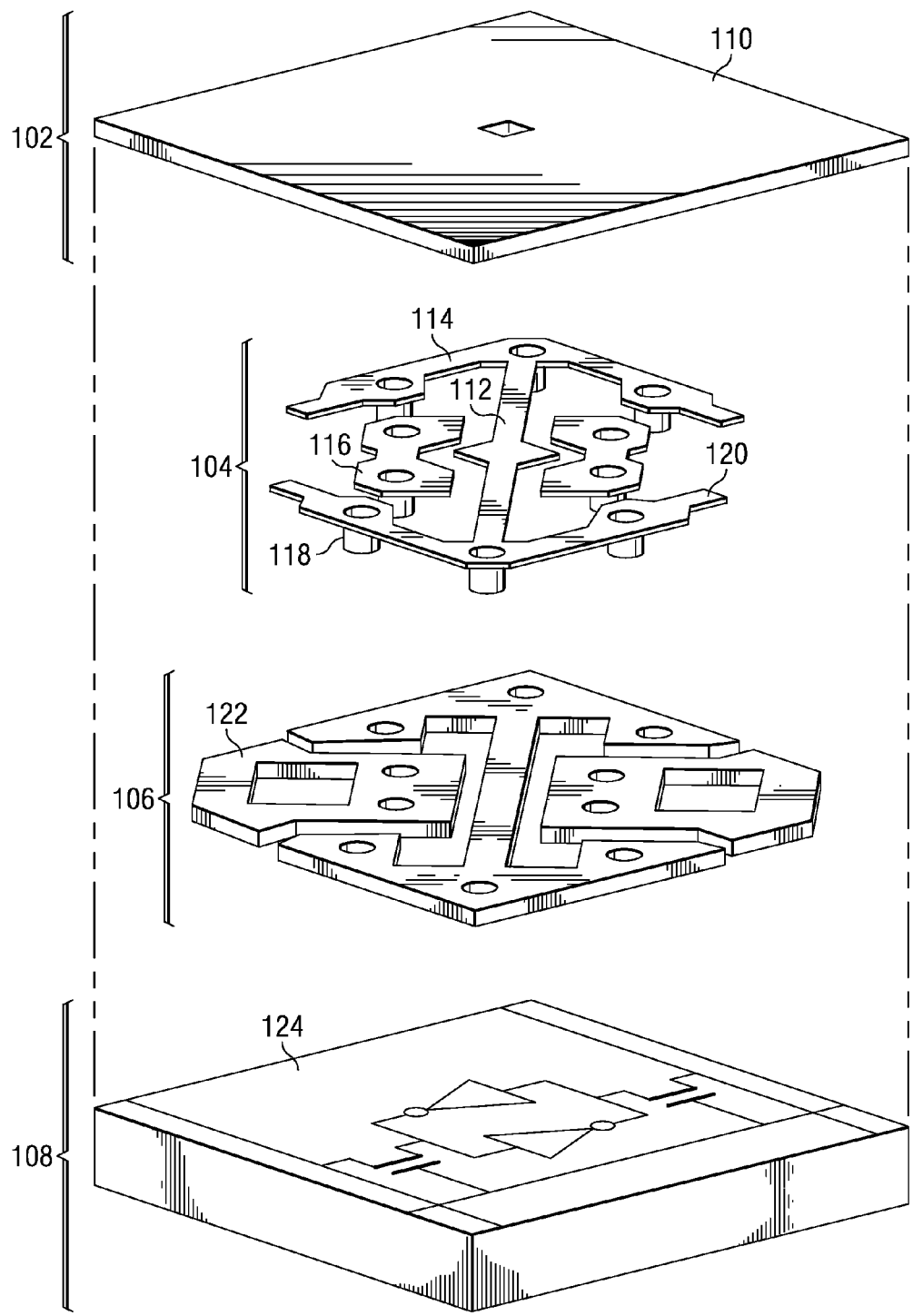
FIG. 1A illustrates a micromirror device in the prior art.
Figure 1B:
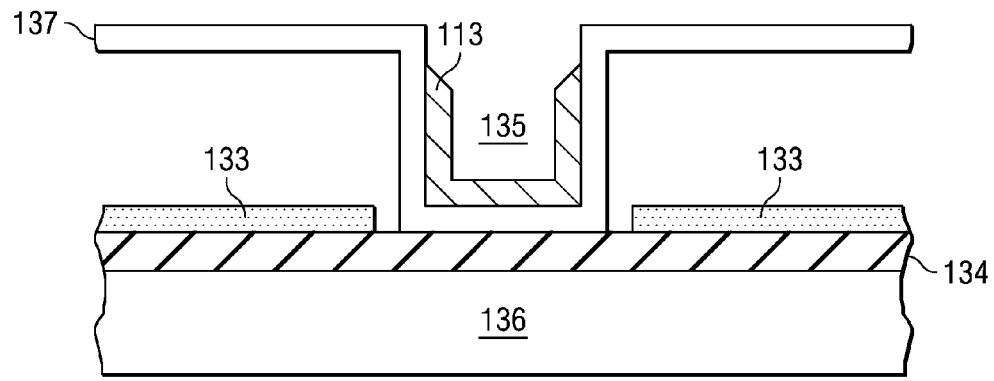
FIG. 1B illustrates a cross-sectional view of a portion of the micromirror device in FIG. 1A.
Figure 2:
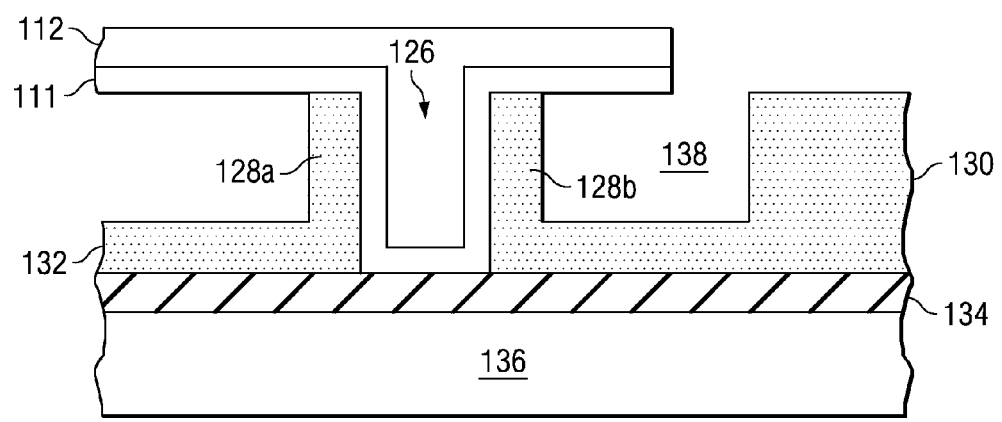
FIG. 2 illustrates a cross-sectional view of a portion of a micromirror device with a dielectric material.

Referring to the drawings, FIG. 2 schematically illustrates a cross sectional view of a portion of a micromirror device. In this example, metallic layer 136 is provided for electrodes of the micromirror device. The metallic layer (136) can be formed on a substrate, such as a semiconductor substrate (e.g. substrate 124 in FIG. 1A) on which electronic circuits are formed. Conductive layer 134 is formed on the metallic layer (136). Other layers, such as an etch stop layer and/or an anti reflective coating (ARC) layer may be deposited on top of conductive layer 134, though not required. A dielectric layer of a selected dielectric material is deposited on the conductive layer (134) and patterned into dielectric portions 130 and 132. The dielectric portions (130 and 132) together define via region 126 in which a hinge post is formed for supporting the deformable hinge. Specifically, vertical wall 128a of dielectric portion 132, vertical wall 128b of dielectric portion 130, and a portion of conductive layer 134 between walls 128a and 128b together define the via region (126). Conductive hinge layer 111, which can be a member of the deformable hinge (112), or can be the deformable hinge, extends from the deformable hinge to the sidewalls and the bottom of the via region (126). In one example wherein deformable hinge 112 comprises conductive hinge layer 111 and another hinge layer that may or may not have the same material as conductive layer 111, the conductive hinge layer (111) may be deposited such that walls 128a and 128b, as well as the bottom of the via region, are substantially covered by the conductive hinge layer (111); and the via region can then be filled with the material of the other hinge layer. In the example wherein the deformable hinge is composed of single layer, such as layer 111, the via region (126) can be filled with layer 111 when forming the deformable hinge. As an aspect of the example, the conductive hinge layer (111) can be in contact with the sidewalls 128a and 128b of the dielectric portions 132 and 130. Conductive hinge layer 111 can also be in contact with the top surface of conductive layer 134 at the bottom of the via region (126). In other possible examples, other electrically conductive and/or insulating layers can be formed between conductive hinge layer 111 and each one of the dielectric sidewalls 128a and 128b for many desired purposes, such as for improving the mechanical and/or electrical properties. A barrier layer, such as a $TiN_x$ layer, can also be provided between each one of the dielectric sidewalls 128a and 128b and conductive hinge layer 111 for preventing potential diffusion between the conductive hinge layer 111 and dielectric sidewalls.

The dielectric layer for dielectric portions 130 and 132 can be patterned to have other suitable features in favor of the operation and performance of the deformable hinge. For example, cavity 138 can be formed in the dielectric portion 130 for allowing deformation of deformable hinge 112.

Figure 3:
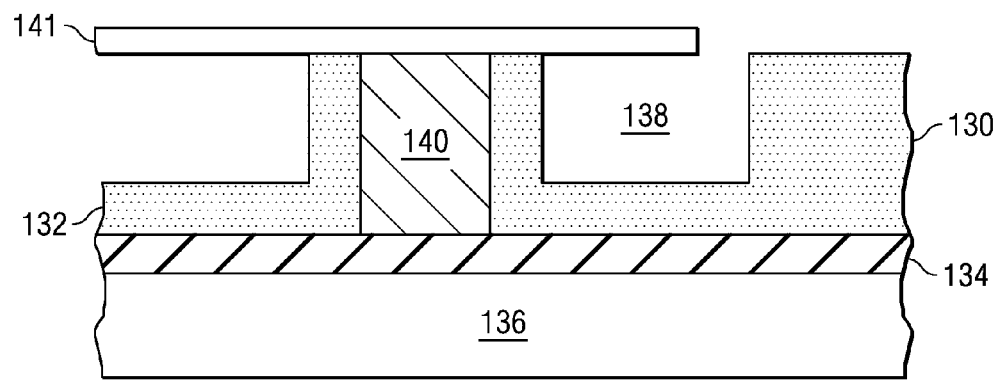
FIG. 3 illustrates a cross-sectional view of a portion of a micromirror device with a dielectric material, wherein the hinge post is filled with a selected material.

Other than filling or lining the via region (126) with the deformable hinge material(s), the via region can be filled with other selected material(s) than the material(s) of the deformable hinge, an example of which is schematically illustrated in the cross-sectional view in FIG. 3.

Referring to FIG. 3, the via region is filled with an electrically conductive material so as to electrically connecting the upper deformable hinge (141) to the bottom conductive layer 134 as illustrated in the figure.

In the above examples as illustrated in FIG. 2 and FIG. 3, conductive hinge layer 111 is the bottom-most layer of the deformable hinge; and the conductive hinge layer 111 is either directly connected to the conductive layer 134 on the electrode portion of the micromirror device, or directly connected to the conductive filing material of the post (via region). Other configurations are also applicable. For example, an insulating hinge layer can be the bottom-most layer of the deformable hinge. In this example, the insulating hinge layer can be patterned with an opening such that the conductive hinge layer can be formed to contact with the conductive layer 134 through the opening.

The dielectric layer for the dielectric portions 130 and 132 can be of any suitable dielectric materials, such as silicon oxides, silicon nitrides, oxynitrides, spin on glasses, and many other possible materials. The material filling in the via region as illustrated in FIG. 3 can be any suitable electrically conductive materials, such as W, TiW, Cu, or any other metal elements, metal compounds, metal alloys, and conductive ceramics and polymers.

FIG. 2 and FIG. 3 illustrated therein are cross-sectional views of dielectric materials in the vicinity of a hinge post. The dielectric material can be filled in other regions of the micromirror device in many ways, which is better illustrated in FIG. 4 through FIG. 6d.

Figure 4:
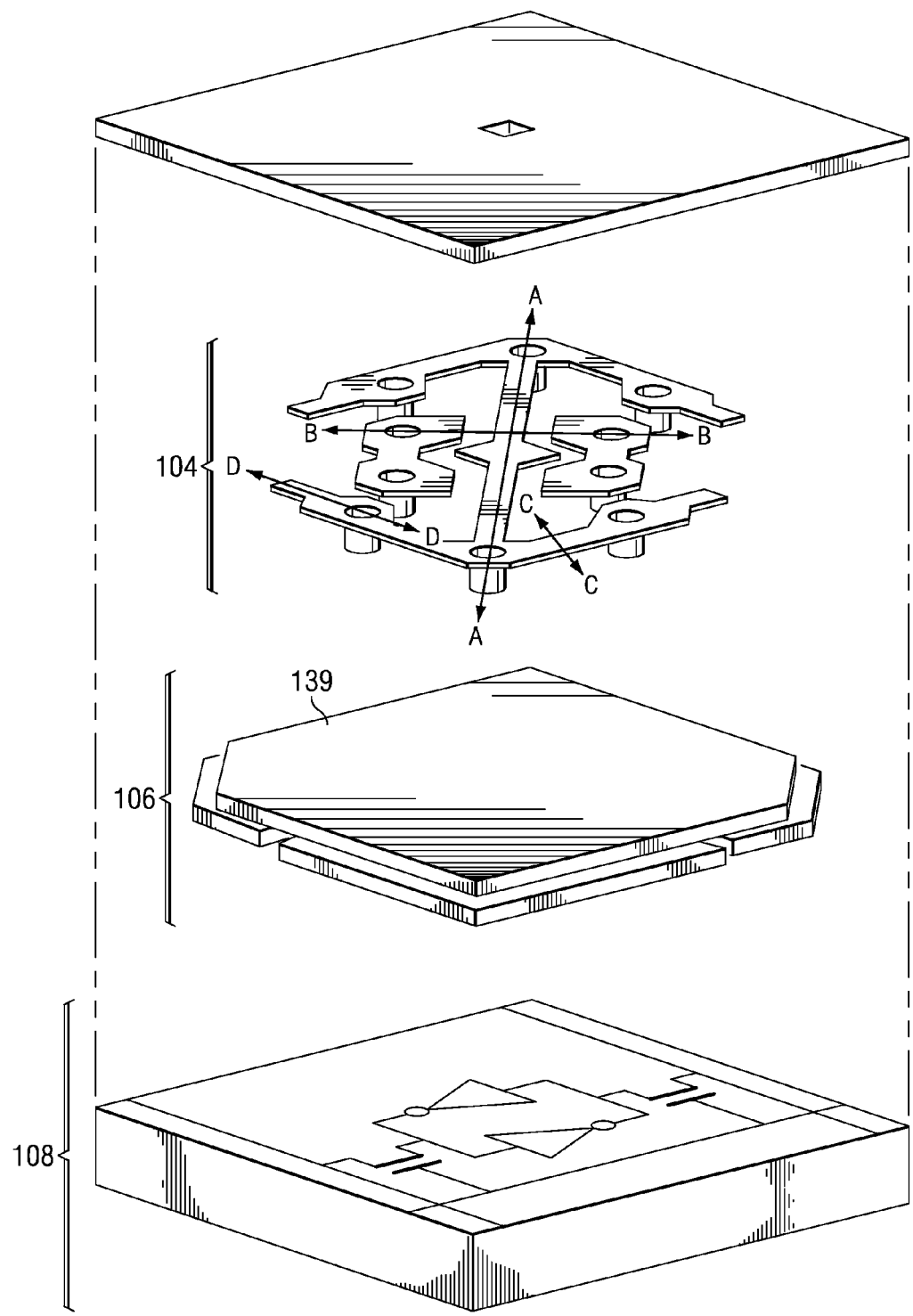
FIG. 4 schematically illustrates an exemplary micromirror device comprising a dielectric material.

Referring to FIG. 4, a selected dielectric material is disposed between hinge structure layer 104 and the electrode layer 106. The dielectric material (140) can be disposed in many ways to accomplish desired purposes. For example, the dielectric material (140) can be disposed in substantially the entire area between the hinge structure layer and the electrode layer except the region directly underneath the deformable hinge and where mirror clearance is needed, which will be detailed in the following with reference to FIG. 5a through FIG. 5d, wherein cross-sectional views taken along lines AA, BB, CC, and DD as shown in FIG. 4 are illustrated. Alternatively, the dielectric material can be disposed in two steps. The first deposition can be performed at a location directly underneath the deformable hinge and the landing tips; and the second deposition can be performed during the hinge etch, which will be detailed in the following with reference to FIG. 6a through FIG. 6d, wherein cross-sectional views taken along lines AA, BB, CC, and DD as shown in FIG. 4 are illustrated. Other configurations within the scope of the disclosure are also applicable. It is noted that for demonstration purpose, some functional members will not be shown. In fact, the micromirrors may have any other desired features.

Figure 5A:
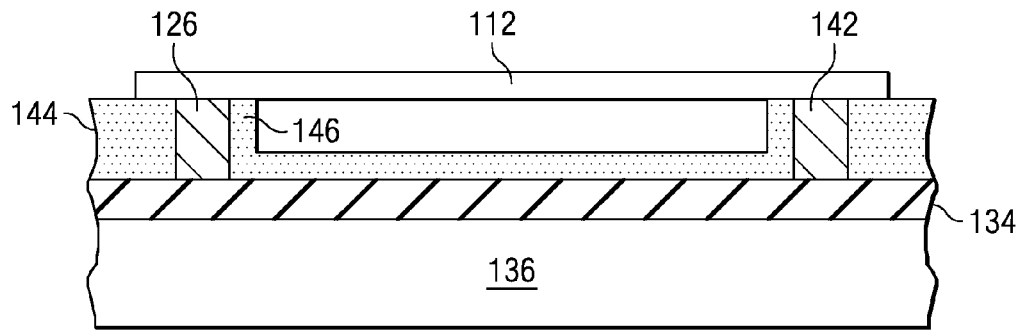
FIG. 5a through FIG. 5d illustrate cross-sectional views of an exemplary configuration of the dielectric materials in the micromirror device in FIG. 4.
Figure 5B:
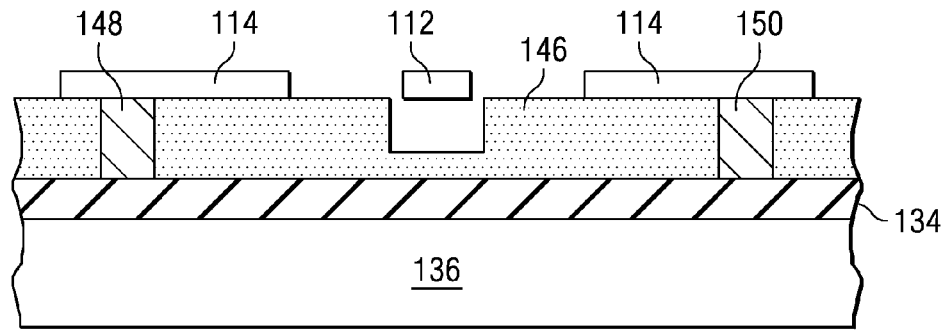

Referring to 5a, a cross-sectional view taken along line AA in FIG. 4 is schematically illustrated therein. Conductive layer 134, such as a $TiN_x$ layer, is formed on metallic layer 136 that forms the addressing electrodes of the micromirror device. The metallic layer (136) can be formed on a semiconductor substrate having an electronic circuit which is not shown for simplicity. Deformable hinge 112 is attached to and held by hinge posts 126 and 142. The hinge posts 126 and 142 each are substantially surrounded by (and contacted to) dielectric portions 144 and 146 of a selected dielectric material. In this example, the dielectric portion (146) directly underneath the deformable hinge is patterned into a trench in favor of deformation of the deformable hinge, as illustrated in FIG. 5b. The dielectric material for dielectric portions 144 and 146 are absent from areas where mechanical clearance is needed for those mechanically movable elements, such as the deformable hinge, reflective mirror plate that is attached to the deformable hinge (which is not shown for simplicity), and stopper (e.g. a stopper with a spring tip, which can be formed at the end of the hinge arms as stopper 120 illustrated in FIG. 1A). In other areas wherein mechanical clearance is not a major concern, alternative features can be formed on the dielectric portions in these areas. For example, the dielectric portions in these areas can be configured as a modulator of aerodynamic damping that affects mirror plate settling time at a state (e.g. the time period during which the mirror plate is settled at an operational state by a stopper). In one example, a layer of the dielectric material for dielectric portions 144 and 146 can be formed on conductive layer 134, as illustrated in FIG. 5a. In another example wherein a etch stop layer and/or an ARC layer is deposited on the top surface of conductive layer 134, substantially no dielectric materials exist in the area between posts 126 and 142 except the side walls defining the via regions for posts 126 and 142.

Referring to FIG. 5b wherein a cross-sectional view along line BB in FIG. 4 is illustrated, the dielectric portion directly underneath the deformable hinge (112) is formed as a trench down to the etch stop/ARC layer (if provided) or down to conductive layer 134. Hinge arm 114 of the hinge structure (104) as illustrated in FIG. 4 is formed on dielectric portion (146) and hinge arm posts 148 and 150. The hinge arm posts (148 and 150) each can be substantially surrounded by (and contacted to) the dielectric material; and can be formed using the same or similar methods as for hinge posts 126 and 142 as discussed above. The same as that in FIG. 5a, the dielectric material can be absent from areas where mechanical clearance is needed for those mechanically movable elements, such as the deformable hinge, reflective mirror plate that is attached to the deformable hinge (which is not shown for simplicity), and stopper (e.g. a stopper with a spring tip, which can be formed at the end of the hinge arms as stopper 120 illustrated in FIG. 1A). In other areas wherein mechanical clearance is not a major concern, alternative features can be formed on the dielectric portions in these areas.

Figure 5C:
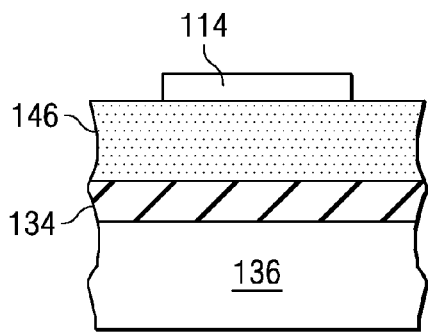

FIG. 5c illustrates a cross-sectional view taken long line CC in FIG. 4. As illustrated in FIG. 5c, conductive layer 134 is formed on metallic layer 136. Dielectric layer 146 is formed on conductive layer 134 or on an etch stop and/or an ARC layer(s) if provided on conductive layer 134; and hinge arm 114 is formed on the dielectric layer.

Figure 5D:
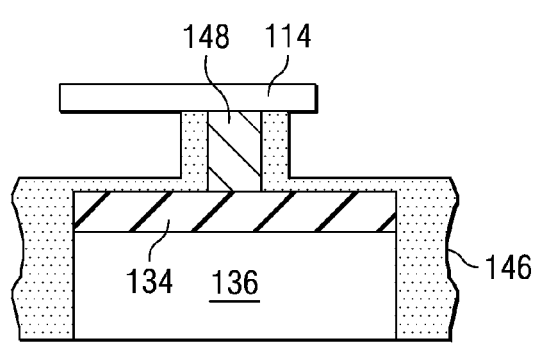

The cross-sectional view taken along line DD in FIG. 4 is schematically illustrated in FIG. 5d. Referring to FIG. 5d, metallic layer 136 has formed thereon conductive layer 134. Hinge arm post is formed on conductive layer 134; and hinge arm 114 is formed on the hinge arm post (148). Dielectric material 146 is formed between the conductive layer (134) and the hinge arm (114). As an example, the dielectric material also fills the gap(s) in the electrode layer (106 in FIG. 4) in which metallic layer 136 and conductive layer 134 are located.

In the above examples, the hinge posts (e.g. 126 and 142) and hinge arm posts (e.g. 148 and 150) each can be filled with a material of the deformable hinge as discussed above with reference to FIG. 2a, or alternatively, can be filled with a selected material for desired purposes, such as filled with an electrical conductive material for improving electrical integrity of the deformable hinge and/or mechanical property of the posts, as discussed above with reference to FIG. 2b.

In an alternative example, which will be schematically illustrated in FIG. 6a through FIG. 6d, the dielectric material can be formed in region directly underneath the deformable hinge and other desired features, such as the stopper. Such dielectric feature can be formed by two separate steps. The first step can form a trench directly underneath the deformable hinge and other mechanically movable elements, such as a stopper so as to allow mechanical movements of these elements. The second step can remove the dielectric materials at locations above which portions of the following hinge layer are patterned to form the deformable hinge. The etching process may leave some dielectric on layer 134 or stop on the etch stop/ARC layer.

Figure 6A:
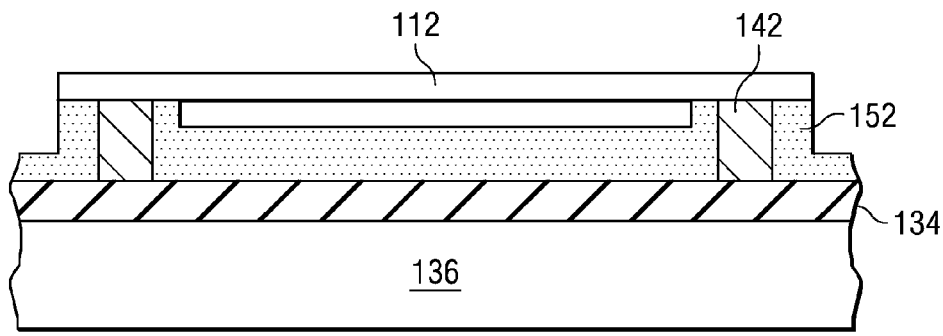
FIG. 6a through FIG. 6d illustrate cross-sectional views of another exemplary configuration of the dielectric material in the micromirror device in FIG. 4.

Referring to FIG. 6a, conductive layer 134 is formed on metallic layer 136. Hinge posts 142 are formed on the conductive layer (134); and deformable hinge 112 is formed on and supported by the hinge posts. Dielectric material 152 is formed in a region underneath the deformable hinge, which is better illustrated in FIG. 6b. It is noted that a trench (gap) is formed between the bottom surface of deformable hinge 112 and the top surface of the dielectric portion underneath the deformable hinge. This trench is provided to allow mechanical movement (e.g. deformation) of the deformable hinge.

Figure 6B:
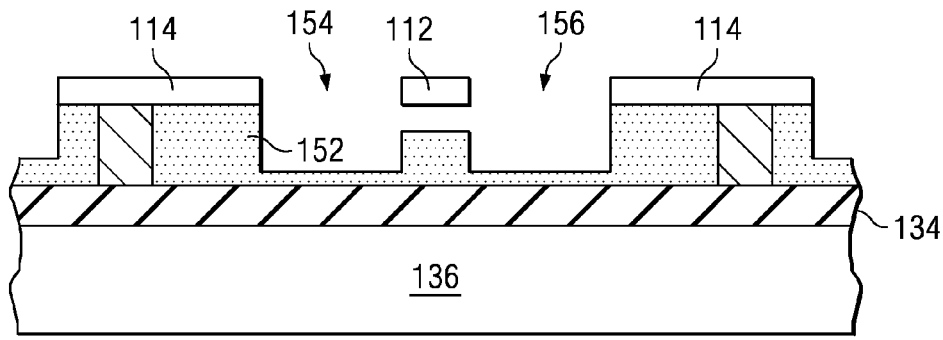

Referring to FIG. 6b wherein a cross-sectional view taken along line BB in FIG. 4 is illustrated, deformable hinge 112 is connected to hinge arm 114 that is formed on and supported by hinge arm posts. The hinge arm posts are formed on the conductive layer. A protuberance of a dielectric material can be formed in a region substantially directly underneath the deformable hinge; while the top surface of the protuberance and the bottom of the deformable hinge has a vertical gap such that the deformable hinge is capable of being deformed. Regions on both sides of the deformable hinge are formed as cavities 154 and 156 in favor of the deformation of the deformable hinge.

Figure 6C:
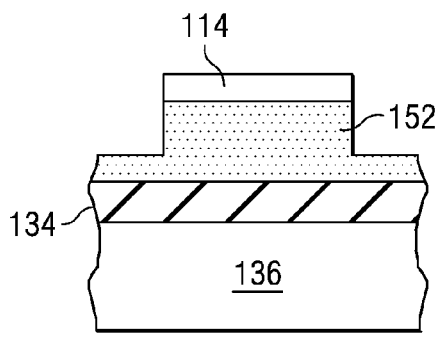

A cross-sectional view taken along line CC in FIG. 4 is schematically illustrated in FIG. 6c. Hinge arm 114 is formed on dielectric material 152; and the dielectric material is formed on conductive layer 134 or on an etch stop/ARC layer if provided on metallic layer 136.

Figure 6D:
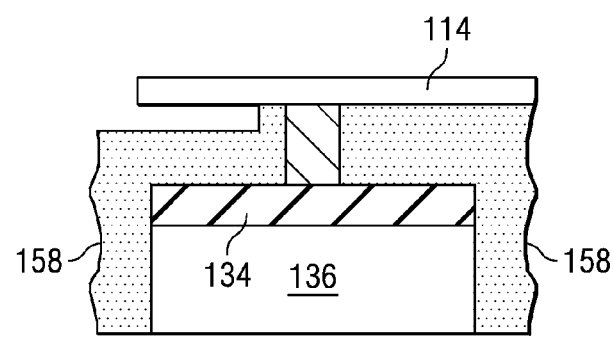

A cross-sectional view taken along line DD in FIG. 4 is schematically illustrated in FIG. 6d. Hinge arm 114 is formed on and supported by a hinge arm post that is formed on the conductive layer and the metallic layer. As shown in the figure, dielectric material is removed under the landing tip in a first step corresponding to the dielectric protuberance underneath the deformable hinge as shown in FIG. 6b. The second step removes the dielectric material to a lower step corresponding to the vacancies (154 and 156 in FIG. 6b) on the sides of the deformable hinge. As a result, the dielectric portion on each side of the hinge arm post has a stepwise profile with substantially two steps resulted from the above two etching processes.

In the above examples, the hinge posts (e.g. 142) and hinge arm posts each can be filled with a material of the deformable hinge as discussed above with reference to FIG. 2a, or alternatively, can be filled with a selected material for desired purposes, such as filled with an electrical conductive material for improving electrical integrity of the deformable hinge and/or mechanical property of the posts, as discussed above with reference to FIG. 2b. The same as that discussed with reference to FIG. 5a, the dielectric material can be removed from areas where mechanical clearance is needed for those mechanically movable elements, such as the deformable hinge, reflective mirror plate that is attached to the deformable hinge (which is not shown for simplicity), and stopper (e.g. a stopper with a spring tip, which can be formed at the end of the hinge arms as stopper 120 illustrated in FIG. 1A). In other areas wherein mechanical clearance is not a major concern, alternative features can be formed on the dielectric portions in these areas.

The micromirror device with the deformable hinge and dielectric layers as discussed above with reference to FIG. 5a through 5b and FIG. 6a through FIG. 6b can be fabricated in many ways, selected examples of which will be discussed in the following with reference to flow charts in FIG. 7 through FIG. 10.

Figure 7:
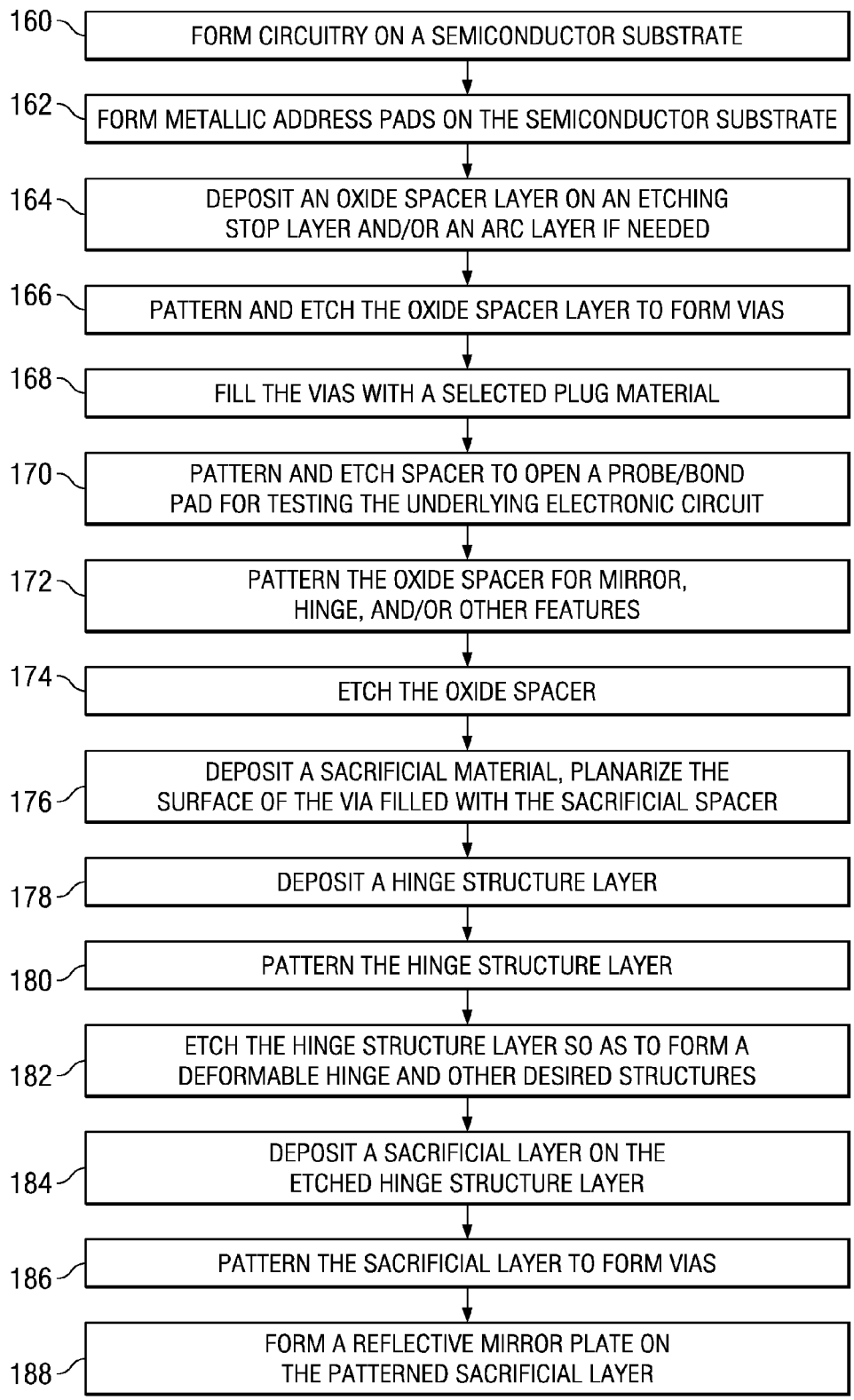
FIG. 7 is a flow chart showing the steps executed in an exemplary fabrication process for making a micromirror device.

Referring to FIG. 7, a semiconductor substrate is provided and electronic circuitry is formed on the semiconductor circuitry (step 160) so as to form the semiconductor portion 108 in FIG. 4. The semiconductor substrate can be a standard silicon substrate, wafer, or any other suitable substrates on which electronic circuits, such as integrated circuits can be fabricated. The electronic circuitry can be a memory cell, such as a random-access-memory cell, a read-only-memory-cell, a latch, or any other storage cells capable of storing a voltage signal (digital or analog).

Metallic addressing pads, such as element 122 in FIG. 1a, as well as other structures, are formed on the semiconductor substrate (step 162) so as to obtain addressing layer 106 in FIG. 4. The metallic addressing pads can be formed by depositing a selected metallic material on the semiconductor substrate followed by patterning the deposited metallic layer. The patterned metallic layer can then be etched so as to obtain desired structures, such as addressing electrodes (e.g. 102) and other desired structures in the metallic layer, such as those illustrated in FIG. 1a.

On the formed metallic layer, a selected dielectric material, such as an oxide material (e.g. $SiO_2$) is deposited (step 164). As an alternative feature, an etch stop and/or ARC layer(s) may be deposited on the metallic layer formed at step 162 prior to depositing the oxide spacer; and the oxide spacer in this alternative example can be deposited on the etch stop and/or ARC layer(s). The deposited dielectric material is then patterned and etched so as to form desired via regions, such as via regions 126 in FIG. 2, 140 in FIG. 3 for hinge posts and/or hinge arm posts (step 166). A selected material, such as an electrically conductive material or any suitable materials, fills the formed via regions (step 168) so as to obtain the desired hinge posts (e.g. 126 and 142 in FIG. 5a) and/or posts (e.g. address electrode posts 148 and 150 in FIG. 5b). The deposited layer of the selected material can be etched to form the desired posts followed by polish to modify the surfaces of the posts for creating an electrical connection to the hinge layer. The spacer layer (dielectric layer) can be patterned and etched to open a bond/probe pad for testing the underlying electronic circuits (step 170).

After forming the hinge posts and hinge arm posts the dielectric layer is further patterned (step 172) for the deformable hinge, reflective mirror plate, and other desired features. For example, the dielectric layer can be patterned so as to form the trench substantially underneath the deformable hinge location, as discussed above with reference to FIG. 5a and FIG. 5b.

The dielectric layer can then be etched to remove undesired portions (step 174). The etching is performed depending upon the specific dielectric material used, and which can be wet etch, dry etch, etch with a spontaneous vapor phase etchant, or etch with an energized etchant, such as plasma etch. Preferred etchants for etching the dielectric material are spontaneous chemical vapor phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The etching process may comprise additional gas components, such as $N_2$ or an inert gas (Ar, Xe, He, etc.). In this way, the remaining dielectric material can be removed. In one aspect of such example, $XeF_2$ is provided in an etching chamber with diluent (e.g. $N_2$ and He). The concentration of $XeF_2$ is preferably 8 Torr, although the concentration can be varied from 1 Torr to 30 Torr or higher. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in etching the selected dielectric material, there are others that may also be used by themselves or in combination. Some of these include wet etches, such as ACT, KOH, TMAH, HF (liquid); oxygen plasma, $ScCO_2$, or supercritical $CO_2$. Of course, the use of any of these etchants/methods requires that the material(s) to be etched are not resistant to the particular etchant used. In the case where an etch stop and/or ARC layer is used, the etchant should be selective to that layer so that the dielectric layer 140 may be removed completely in desired/patterned regions.

To form a planar surface over which the deformable structures are deposited, a sacrificial layer(s) is deposited (step 176) and planarized to the top of the filled vias and/or the top surface of the dielectric material that is not removed. Exemplary planarizing material can be an organic resist and/or Bottom Antireflective coat (BARC) material. Other sacrificial material may be used and etched/ashed during assembly of the MEM structure. Organic sacrificial material is usually removed using a plasma ash to free the structure as part of the assembly process. For example, in wafer level packaging, the wafers go through an undercut process (plasma ash) to free the mirror structures before a glass window is bonded to the wafer.

After curing the planarizing material, the hinge structure can then be fabricated starting from step 178, wherein one or more hinge layers of selected hinge materials are deposited on the sacrificial and dielectric layers. The hinge layer(s) can then be patterned at step 180 followed by etching the patterned hinge structure layer(s) so as to form the desired deformable hinge, hinge arms, and other desired structures. The patterning of the hinge structure can be achieved using the standard photoresist patterning followed by etching using, for example $CF_4$, $Cl_2$, or other suitable etchant depending upon the specific material of the hinge material(s).

Following the formation of the hinge structure, the reflective mirror plate can be formed, which starts from step 184 wherein a selected sacrificial material, such as an organic material or an inorganic material (e.g. amorphous silicon) is deposited on the formed hinge structure (step 184). The deposited sacrificial layer is then patterned (step 186) followed by etching so as to form a mirror post region. The reflective mirror plate can then be formed on the sacrificial layer (step 188), which may comprise multiple steps, such as depositing one or more mirror plate layers on the sacrificial layer; and patterning the mirror plate layers. The reflective mirror plate layers may comprise aluminum, copper, silver, alloys of such and other conductive and reflective materials. Some examples of reflective mirror plates are AlSiTi and AlCu alloys. Multiple layers including one or more non-conductive materials may also be used.

After forming the reflective mirror plate layer(s), the sacrificial material is removed so as to release the micromirror device structures. Depending upon the specific sacrificial material used, the etching process for the sacrificial material can be performed in many ways, such methods for etching the dielectric materials as discussed above. Of course, the sacrificial material can be removed using other suitable methods and/or etchants.

Figure 8:
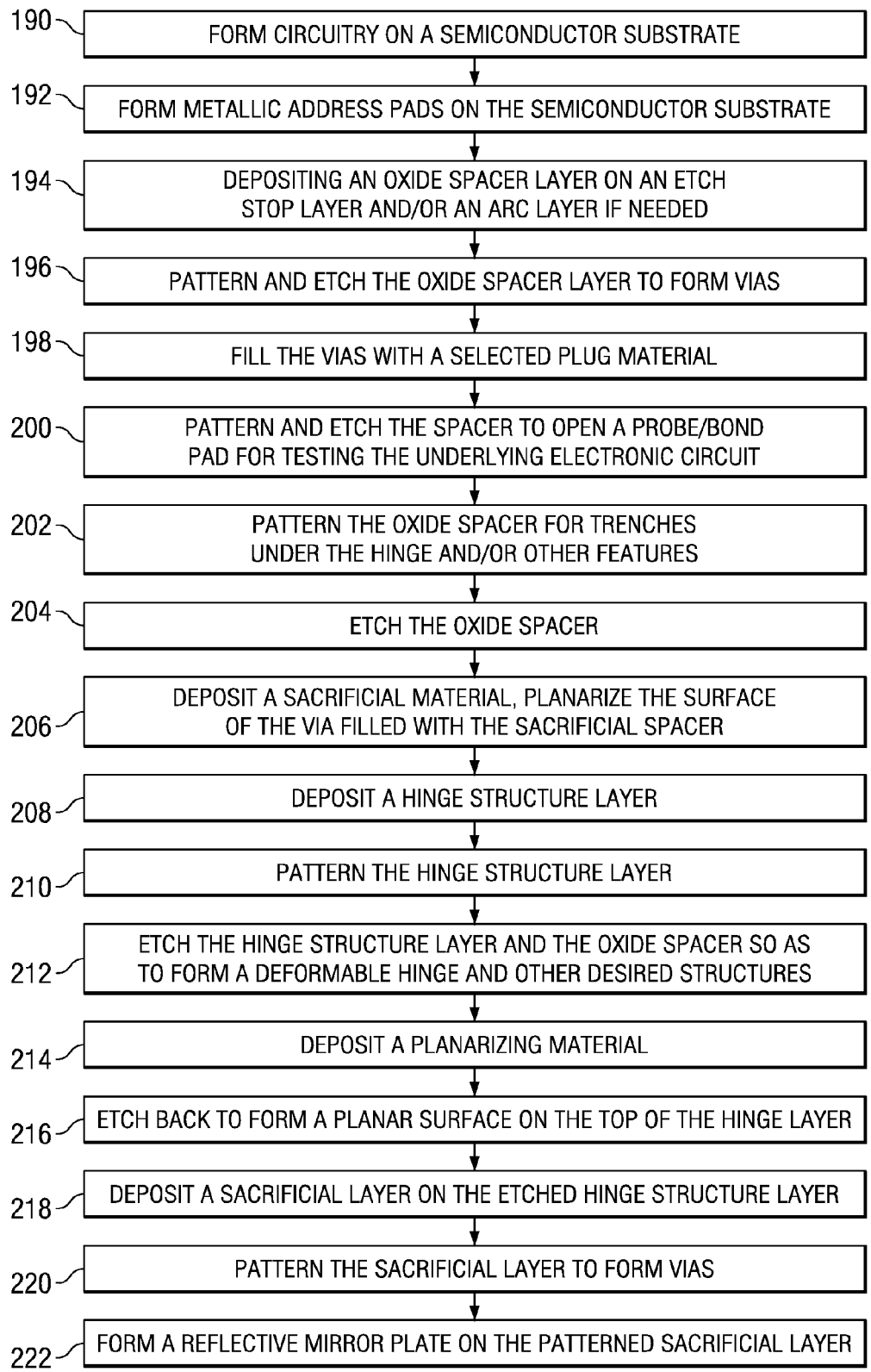
FIG. 8 is a flow chart showing the steps executed in another exemplary fabrication process for making a micromirror device.

Another exemplary fabrication method is demonstrated in the flow chart in FIG. 8. Referring to FIG. 8, a semiconductor substrate is provided and electronic circuitry is formed on the semiconductor circuitry (step 190) so as to form the semiconductor portion 108 in FIG. 4. The semiconductor substrate can be a standard silicon substrate, wafer, or any other suitable substrates on which electronic circuits, such as integrated circuits can be fabricated. The electronic circuitry can be a memory cell, such as a random-access-memory cell, a read-only-memory-cell, a latch, or any other storage cells capable of storing a voltage signal (digital or analog).

Metallic addressing pads, such as element 122 in FIG. 1a, as well as other structures, are formed on the semiconductor substrate (step 192) so as to obtain addressing layer 106 in FIG. 4. The metallic addressing pads can be formed by depositing a selected metallic material on the semiconductor substrate followed by patterning the deposited metallic layer. The patterned metallic layer can then be etched so as to obtain desired structures, such as addressing electrodes (e.g. 102) and other desired structures in the metallic layer, such as those illustrated in FIG. 1a.

On the formed metallic layer, a selected dielectric material, such as an oxide material (e.g. $SiO_2$) is deposited (step 194). As an alternative feature, an etch stop and/or ARC layer(s) may be deposited on the metallic layer formed at step 192 prior to depositing the oxide spacer layer; and the oxide spacer in this alternative example can be deposited on the etch stop and/or ARC layer(s). The deposited dielectric material is then patterned and etched so as to form desired via regions, such as via regions 126 in FIG. 2, 140 in FIG. 3 for hinge posts and/or hinge arm posts (step 196). A selected material, such as an electrically conductive material or any suitable materials, fills the formed via regions (step 198) so as to obtain the desired hinge posts (e.g. 126 and 142 in FIG. 5*a*) and/or address electrode posts (e.g. address electrode posts 148 and 150 in FIG. 5*b*). The dielectric material may be patterned and etched to open probe/bond pads for testing the underlying electronic circuits (step 200).

After forming the hinge posts and hinge arm posts the dielectric layer is further patterned (step 202) so as to form the trenches substantially underneath the deformable hinge location, as discussed above with reference to FIG. 5*a* and FIG. 5*b*.

The dielectric layer can then be etched to remove undesired portions (step 204). The etching can be performed with the same method as discussed above with reference to step 174 in FIG. 7, which will not be repeated herein.

To form a planar surface over which the deformable structures are deposited, a sacrificial layer(s) is deposited (step 206) and planarized to the top surface of the filled vias and dielectric material not removed. Exemplary planarizing material can be organic resist and/or Bottom Antireflective coat (BARC) material. Other sacrificial material may be used here and etched/ashed during assembly of the MEM structure.

After curing the planarizing material, the hinge structure can then be fabricated starting from step 208, wherein one or more hinge layers of selected hinge materials are deposited on the etch stop layer. The hinge layer(s) can then be patterned at step 210 followed by etching the patterned hinge structure layer(s) and dielectric material so as to form the desired deformable hinge, hinge arms, and other desired structures (step 212). The patterning of the hinge structure can be achieved using the standard photoresist patterning followed by etching using, for example $CF_4$, $Cl_2$, or other suitable etchant depending upon the specific material of the hinge material(s).

Following the formation of the hinge structure, planarizing layer(s), which may or may not be the same as the ones used in step 206 is deposited on the formed hinge structure (step 214). The planarizing layer(s) is etched back to the top surface of the hinge layer to form a planar surface (step 216).

On top of the planar surface at step 216, the reflective mirror plate can be formed, which starts from step 218 wherein a selected sacrificial material, such as an organic material or an inorganic material (e.g. amorphous silicon) is deposited on the formed hinge structure (step 218). The deposited sacrificial layer is then patterned (step 220) followed by etching so as to form a mirror post region. The reflective mirror plate can then be formed on the sacrificial layer (step 222), which may comprise multiple steps, such as depositing one or more mirror plate layers on the sacrificial layer; and patterning the mirror plate layers. The reflective mirror plate layers may comprise aluminum, copper, silver, alloys of such and other conductive and reflective materials. After forming the reflective mirror plate layer(s), the sacrificial material is removed so as to release the micromirror device structures. Depending upon the specific sacrificial material used, the etching process for the sacrificial material can be performed in many ways, such methods for etching the dielectric materials as discussed above. Of course, the sacrificial material can be removed using other suitable methods and/or etchants.

Figure 9:
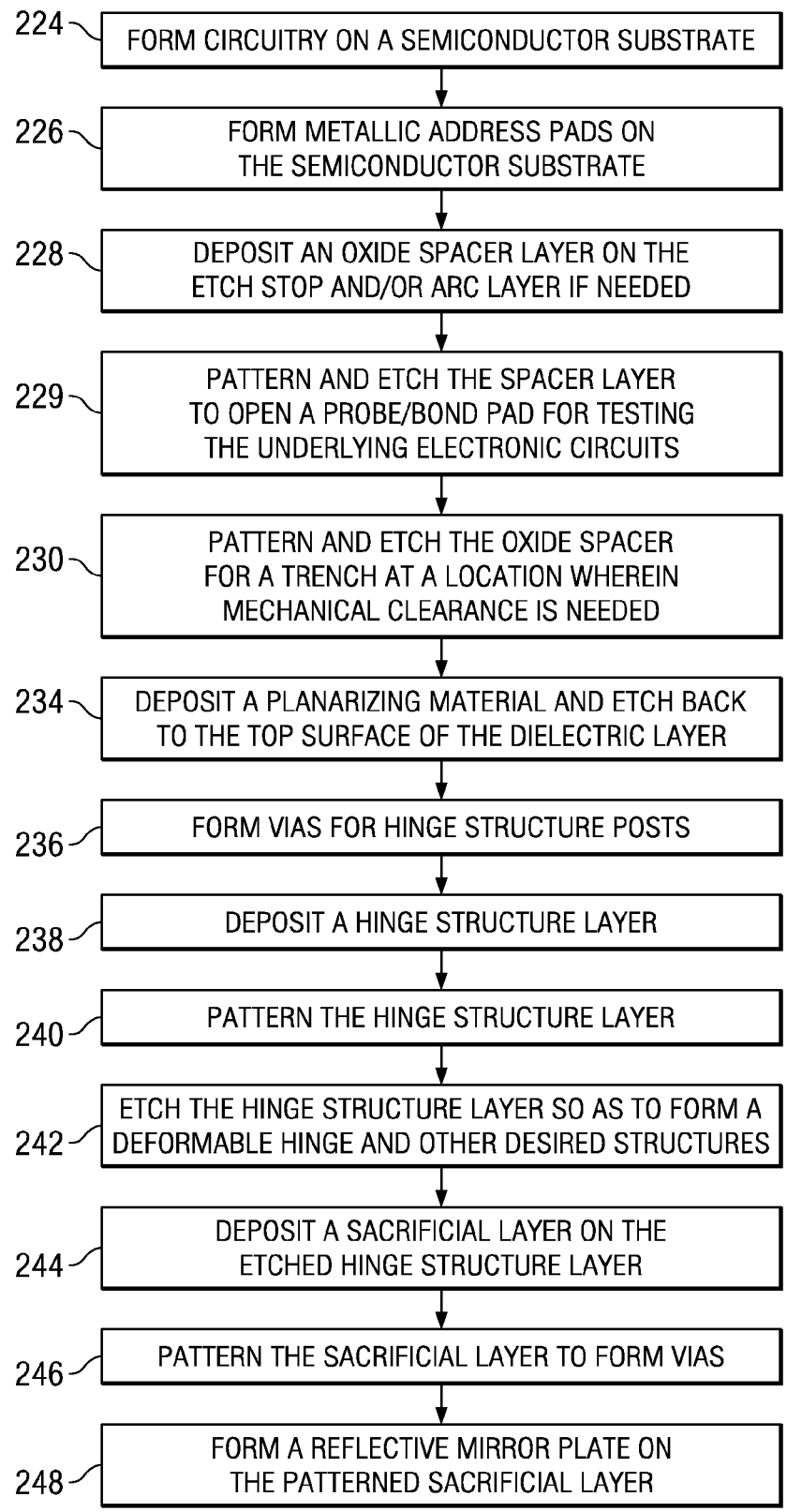
FIG. 9 is a flow chart showing the steps executed in yet another exemplary fabrication process for making a micromirror device.

Yet another exemplary fabrication method is demonstrated in the flow chart in FIG. 9. Referring to FIG. 9, a semiconductor substrate is provided and electronic circuitry is formed on the semiconductor circuitry (step 224) so as to form the semiconductor portion 108 in FIG. 4.

Metallic addressing pads, such as element 122 in FIG. 1*a*, as well as other structures, are formed on the semiconductor substrate (step 226) so as to obtain addressing layer 106 in FIG. 4. The metallic addressing pads can be formed by depositing a selected metallic material on the semiconductor substrate followed by patterning the deposited metallic layer. The patterned metallic layer can then be etched so as to obtain desired structures, such as addressing electrodes (e.g. 102) and other desired structures in the metallic layer, such as those illustrated in FIG. 1*a*. An etch stop and/or ARC layer(s) such as silicon nitride or other layers of similar refractive index may be deposited on the metallic layer. The dielectric material may be patterned and etched to open probe/bond pads for testing the underlying electronic circuits (step 229).

On top of the formed metallic address pads, a selected dielectric material, such as an oxide material (e.g. $SiO_2$) is deposited (step 228). The deposited dielectric material is then patterned and etched so as to form trenched regions for mechanical clearance, such as via post regions 128 in FIG. 2 and regions 138 in FIG. 3 for mirror plate, hinge and landing tips (step 230). The formed trench can then be protected by depositing a sacrificial material. A planarizing layer(s) is deposited on the sacrificial layer and etched back to top of dielectric layer to form the surface on which the hinge structure is deposited (step 234). The vias for hinge structure layer can then be formed in the dielectric material by pattern and etch (step 236).

Selected hinge structure materials are deposited (step 238) followed by patterning the deposited hinge structure layer (step 240) and etching the patterned hinge structure layer (step 242) so as to obtain the desired deformable hinge and other features if desired.

After forming the hinge structure layer, the reflective mirror plate can be formed, which starts from step 244 wherein a selected sacrificial material, such as an organic material or an inorganic material (e.g. amorphous silicon) is deposited on the formed hinge structure. The deposited sacrificial layer is then patterned (step 246) followed by etching so as to form a mirror post region. The reflective mirror plate can then be formed on the sacrificial layer (step 248), which may comprise multiple steps, such as depositing one or more mirror plate layers on the sacrificial layer; and patterning the mirror plate layers.

After forming the reflective mirror plate layer(s), the sacrificial material is removed so as to release the micromirror device structures. Depending upon the specific sacrificial material used, the etching process for the sacrificial material can be performed in many ways, such methods for etching the dielectric materials as discussed above. Of course, the sacrificial material can be removed using other suitable methods and/or etchants.

Figure 10:
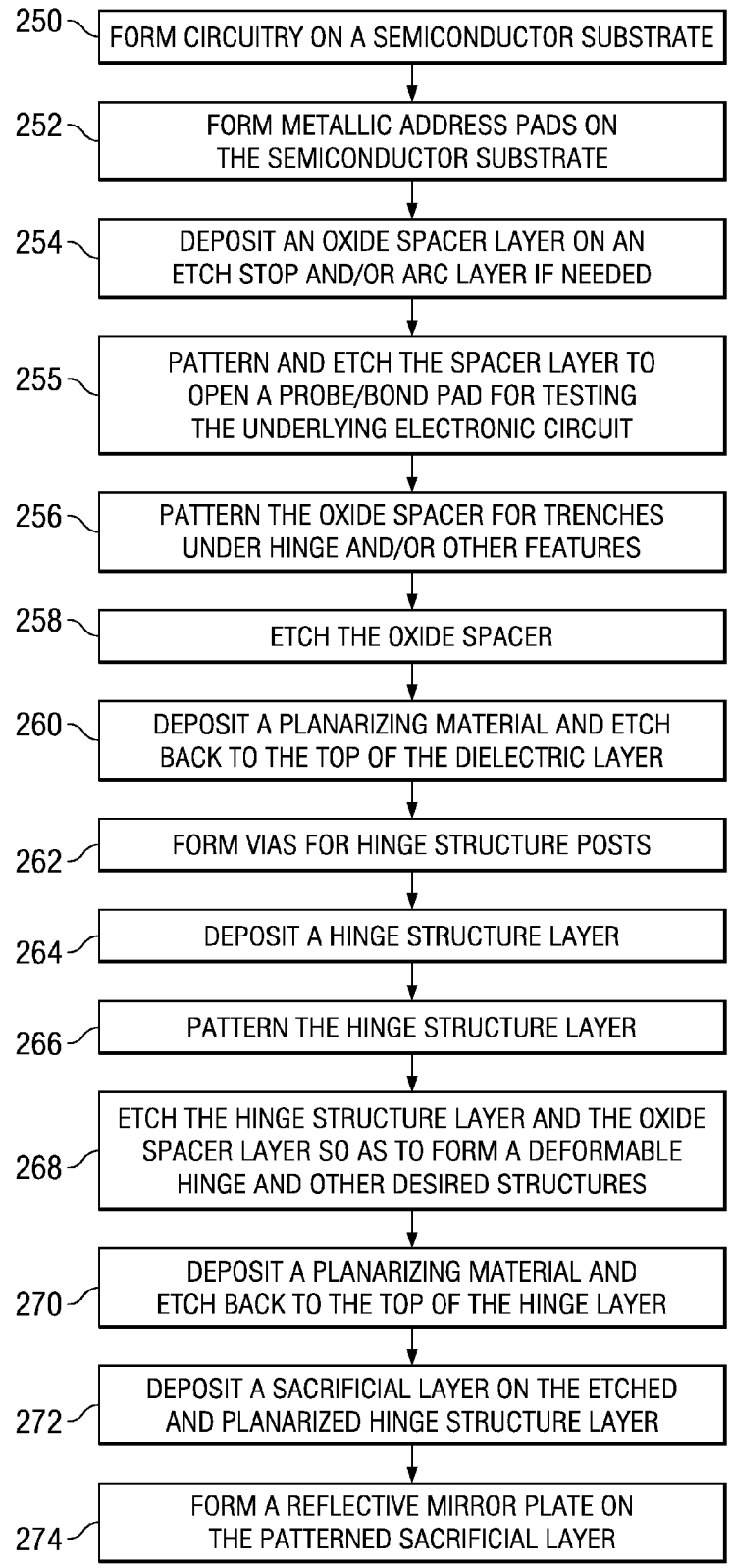
FIG. 10 is a flow chart showing the steps executed in still yet another exemplary fabrication process for making a micromirror device.

Another exemplary fabrication method is demonstrated in the flow chart in FIG. 10. Referring to FIG. 10, a semiconductor substrate is provided and electronic circuitry is formed on the semiconductor circuitry (step 250) so as to form the semiconductor portion 108 in FIG. 4.

Metallic addressing pads, such as element 122 in FIG. 1*a*, as well as other structures, are formed on the semiconductor substrate (step 252) so as to obtain addressing layer 106 in FIG. 4. The metallic addressing pads can be formed by depositing a selected metallic material on the semiconductor substrate followed by patterning the deposited metallic layer. The patterned metallic layer can then be etched so as to obtain desired structures, such as addressing electrodes (e.g. 102) and other desired structures in the metallic layer, such as those illustrated in FIG. 1a. An etch stop and/or ARC layer(s) may be deposited on the metallic layer.

On the formed metallic layer, a selected dielectric material, such as an oxide material (e.g. $SiO_2$) is deposited (step 254). The dielectric material may be patterned and etched to open probe/bond pads for testing the underlying electronic circuits (step 255). The deposited dielectric material is then patterned (step 256) and etched (step 258) so as to form desired features in the dielectric layer, such as the features of the dielectric cavities underneath the deformable hinge (e.g. illustrated in FIG. 6b) or other structures at end of hinge arms (e.g. illustrated in FIG. 6d). The formed features on the spacer layer can then be protected by depositing a sacrificial material. The cavities, as well as the sacrificial material, are planarized by deposition and etch/ash back of a planarizing material such as organic resist and/or BARC (step 260).

The dielectric layer is then further patterned and etched so as to form via regions for the deformable hinge posts and/or hinge arm posts (step 262). Selected hinge structure materials can then be deposited on dielectric layer and the planarizing layer (step 264). When necessary, a selected filling material can be used to fill the formed via regions before depositing the hinge structure layer.

The deposited hinge structure layer is then patterned at step 266. The patterned hinge structure layer is then etched at step 268 so as to form the deformable hinge and other desired structures. During the etching, the portions of the dielectric layer not under the patterned hinge layer is also etched down for mechanical clearance as illustrated in FIG. 6b and FIG. 6d. A planarization process is then performed by depositing and etching/ashing back of a planarizing material to form a planar surface to top of hinge layer (step 270). The reflective mirror plate can then be formed (step 274) by depositing a sacrificial layer (272) followed by patterning the sacrificial layer to form vias, depositing the mirror plate layer(s), patterning and etching the mirror plate layer(s).

After forming the reflective mirror plate layer(s), the sacrificial material is removed so as to release the micromirror device structures. Depending upon the specific sacrificial material used, the etching process for the sacrificial material can be performed in many ways, such methods for etching the dielectric materials as discussed above. Of course, the sacrificial material can be removed using other suitable methods and/or etchants.

The above discussed fabrication methods can be applied to form an array of micromirrors on the wafer-level. Specifically, a semiconductor wafer can be provided. A plurality of die areas can be defined on the wafer. An array of micromirrors can then be formed in each die area, and a plurality of micromirror device arrays can be formed in all die areas at the same time. For example, each fabrication step of a specific fabrication method as discussed above can be applied to all die areas in the wafer. After forming the micromirrors in the die areas in the wafer, each die can be separated from the wafer so as to obtain individual dies; and the singulated dies can be individual micromirror devices.

The obtained individual micromirror devices may be packaged disposing the micromirror device on a package substrate, and sealing the package with a package lid by bonding the package lid to the package substrate such that the micromirror device is enclosed in a space between the package lid and the package substrate.

The micromirror devices can be packaged on the die-level wherein each micromirror device is separately packaged, as discussed above. Alternatively, the micromirror devices can be packaged on wafer level. Specifically, after forming the micromirror devices on the wafer and before singulating the micromirror devices from the wafer, the a package substrate having a plurality of package frames can be attached to the wafer to form a wafer assembly with each package frame being aligned to a die area that comprises a formed micromirror array device. After packing substantially all micromirror array devices on the wafer, the wafer assembly can then be singulated into individual packaged micromirror array devices.

The micromirror device as discussed above can be employed in variety of applications, one of which is display applications. As an example, FIG. 11 schematically illustrates an exemplary display system in which an array of micromirrors is employed.

Figure 11:
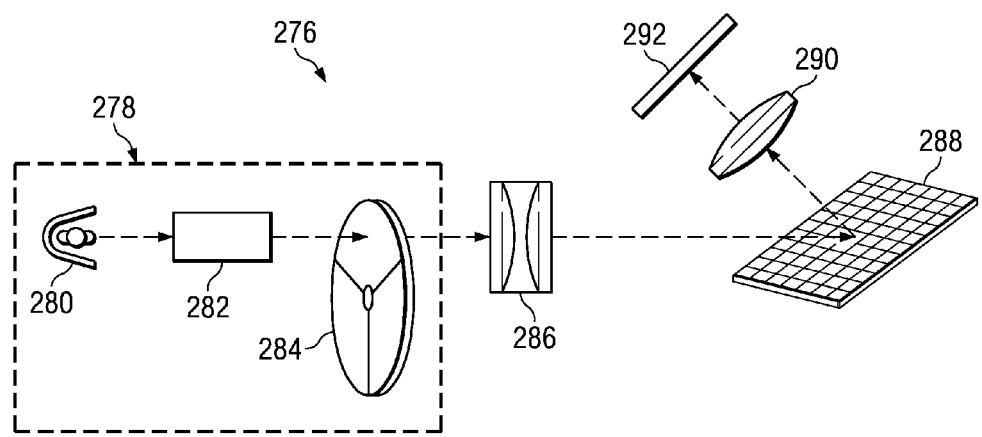
FIG. 11 is an exemplary display system in which the micromirror devices can be implemented.

Referring to FIG. 11, display system 276 comprises illumination system 278, condensing lens 286, spatial light modulator 288 that comprises the array of micromirrors, projection lens 290, and screen 292.

The illumination system provides illumination light for illuminating the spatial light modulator; and may comprise any suitable illuminators, such as arc lamps and solid-state illuminators (e.g. lasers and light-emitting-diodes) and any combinations thereof. As an example illustrated in FIG. 11, the illumination system further comprises illuminator 280, lightpipe 282, and color filter 284 that comprises a plurality of transparent color segments.

The lightpipe collects the light from the illuminator and delivers the collected light onto the color filter, which can be a spinning color wheel. The color filter generates a plurality of colors of light that are sequentially directed to the spatial light modulator through condensing lens 286. The colors of light generated by the color wheel can be any combinations of colors, such as red, green, yellow, cyan, magenta, and white.

The illumination color light is then modulated by the individual micromirrors of the spatial light modulator. The modulated light passes through the projection lens so as to arrive at the screen, or travels away from the projection lens and the screen. The light arrives at the screen is often referred to as ON-state light and generates bright image pixels on the screen. The light traveling away from the screen is often referred to as OFF-state light and generates dark pixels on the screen. A collection of the dark and bright image pixels on the screen forms an image.

The display system can be in any suitable forms, such as a rear-projector, a front projector, a television, and many other suitable imaging systems capable of producing/reproducing desired images on a screen that can be a part of the system or can be a peripheral element of the system.

It will be appreciated by those of skill in the art that a new and useful micromirror device and a method of making the same have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. For example, after depositing the oxide spacer layers in FIG. 7 through FIG. 10, patterning the oxide layers for via regions, micromirror features (e.g. probes/bond pads, mirror, and hinge) can be performed through single patterning step. Therefore, the devices and methods as described herein contemplate all such embodiments as may come within the scope of the following claims and equivalents thereof.

I claim:

1. A method of making a micromirror device, comprising:
   depositing a spacer layer comprising a dielectric material on a substrate having formed thereon an electrically conducting pad;
   patterning and etching the spacer layer so as to form a hinge via region and a clearance region in which at least a portion of the dielectric material is removed;
   filling the hinge via portion with a hinge post material;
   depositing a first sacrificial layer comprising a sacrificial material on the etched spacer layer;
   forming a deformable hinge on the sacrificial material;
   depositing a second sacrificial layer comprising a sacrificial material on the formed deformable hinge;
   forming a reflective mirror on the second sacrificial layer; and
   removing the first and second sacrificial layers so as to form the micromirror device with the spacer material therein.

2. The method of claim 1, wherein the patterned and etched spacer layer forms a hinge via side wall.

3. The method of claim 2, wherein the hinge side wall extends so as to abut against the hinge.

4. The method of claim 1, wherein at least a portion of the spacer layer has a thickness substantially equal to the height of the hinge via region after the step of patterning and etching.

5. The method of claim 1, wherein the patterned and etched hinge via region has a tubular shape.

6. The method of claim 5, wherein tubular shape has a circular or rectangular cross-section.

7. The method of claim 1, wherein the step of patterning and etching the spacer layer further comprises:
   patterning and etching the spacer layer so as to form a trench underneath the location of the deformable hinge so as to allow deformation of the deformable hinge after the first and second sacrificial layers being removed.

8. The method of claim 1, wherein the deformable hinge is connected to via region filled with the hinge post material before removing the first and second sacrificial material.

9. The method of claim 1, wherein the substrate is a semiconductor substrate that comprises an electronic circuit.

10. The method of claim 1, further comprising:
    depositing an etch stop layer on the substrate before depositing the spacer layer; and
    wherein the spacer layer is deposited on the etch stop layer.

11. The method of claim 1, wherein the hinge post material is a hinge material of the deformable hinge.

12. A method of making a micromirror device, comprising:
    depositing a spacer layer comprising a dielectric material on a substrate having an electrode formed thereon;
    patterning and etching the spacer layer so as to form a hinge post via region;
    filling the hinge post via region with a hinge post material;
    patterning the spacer layer to form a trench;
    etching the patterned spacer;
    depositing a first sacrificial material on the spacer layer;
    depositing and patterning a hinge layer on the first sacrificial layer;
    etching the patterned hinge layer and the spacer layer so as to form a deformable hinge at a location in the vicinity of and above the trench;
    depositing and patterning a second sacrificial layer;
    forming a reflective mirror plate on the second sacrificial layer; and
    removing the first and second sacrificial layers so as to form the micromirror device with the dielectric material.

13. The method of claim 12, further comprising:
    depositing an etch stop layer on the substrate before depositing the spacer layer; and
    wherein the spacer layer is deposited on the etch stop layer.

14. The method of claim 12, wherein the step of patterning and etching the spacer layer further comprises:
    patterning the spacer layer so as to form a probe or a bond pad before etching the spacer layer.

15. The method of claim 12, wherein the step of depositing the first sacrificial layer further comprises:
    planarizing the first sacrificial layer to a top surface of the spacer layer.

16. The method of claim 12, wherein the hinge post material is a hinge material of the deformable hinge.

17. A method of making a micromirror device, comprising:
    providing a substrate having an electrode pad formed thereon;
    depositing a spacer layer comprising a dielectric material;
    patterning and etching the spacer layer so as to form a trench;
    depositing a first sacrificial material on the patterned spacer layer;
    forming a hinge via region on the spacer layer;
    forming a deformable hinge on the spacer layer such that the deformable hinge is in connection with the hinge via region and supported thereby above the substrate;
    depositing a second sacrificial layer;
    forming a reflective mirror plate on the second sacrificial layer; and
    removing the first and second sacrificial layers so as to form the micromirror device with at least a portion of the spacer layer.

18. The method of claim 17, further comprising:
    depositing an etch stop layer on the substrate.

19. The method of claim 17, further comprising:
    depositing a planarizing layer on spacer layer after etching the spacer layer for forming the trench; and
    etching the planarizing material back to the top surface of the spacer layer.

20. The method of claim 17, wherein the substrate is a semiconductor substrate that comprises an electronic circuit.

21. A method of making a micromirror device, comprising:
    providing a substrate having an electrode pad formed thereon;
    depositing a spacer layer comprising a dielectric material;
    patterning and etching the spacer layer so as to form a trench and a hinge via region;
    depositing and patterning a hinge layer on the spacer layer;
    etching the patterned hinge layer and the spacer layer so as to form a deformable hinge at a location in the vicinity of and above the trench;
    depositing and patterning a second sacrificial layer;
    forming a reflective mirror plate on the second sacrificial layer; and
    removing the first and second sacrificial layers so as to form the micromirror device with the dielectric material.

22. The method of claim 21, further comprising:
    depositing a planarizing layer on the patterned spacer layer after patterning the spacer layer for the trench; and
    etching the planarizing material back to the top surface of the spacer layer.

23. The method of claim 21, wherein the step of etching and planarizing material is performed after the step of etching the spacer layer for the trench and before the step of etching the spacer layer for the hinge via region.

24. The method of claim 21, wherein the deformable hinge is connected to via region filled with the hinge post material before removing the first and second sacrificial material.

25. The method of claim 21, further comprising:

depositing an etch stop layer on the substrate before depositing the spacer layer; and wherein the spacer layer is deposited on the etch stop layer.

* * * * *